(12) United States Patent
Boland et al.

(10) Patent No.: US 9,230,265 B2
(45) Date of Patent: Jan. 5, 2016

(54) MANAGING TARGETING OF ADVERTISEMENTS BASED ON USER ASSOCIATIONS WITH SOCIAL NETWORKING OBJECTS

(71) Applicant: Facebook, Inc., Menlo Park, CA (US)

(72) Inventors: Brian Thomas Boland, Los Altos, CA (US); Gokul Rajaram, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 178 days.

(21) Appl. No.: 13/683,330

(22) Filed: Nov. 21, 2012

(65) Prior Publication Data

US 2014/0143050 A1 May 22, 2014

(51) Int. Cl.
*G06Q 30/00* (2012.01)
*G06Q 30/02* (2012.01)
*G06Q 50/00* (2012.01)

(52) U.S. Cl.
CPC ............ *G06Q 30/0255* (2013.01); *G06Q 50/01* (2013.01)

(58) Field of Classification Search
CPC .................................................. G06Q 30/0269

USPC ....................................................... 705/14.66
See application file for complete search history.

(56) References Cited

U.S. PATENT DOCUMENTS

2010/0088314 A1* 4/2010 Kuang ........................... 707/733
2011/0258056 A1* 10/2011 Ioffe et al. .................. 705/14.73
2012/0166532 A1 6/2012 Juan et al.

\* cited by examiner

*Primary Examiner* — John G Weiss
*Assistant Examiner* — Scott C Anderson
(74) *Attorney, Agent, or Firm* — Fenwick & West LLP (57) ABSTRACT

An entity provides a competitive block list for one or more of its objects in a social networking system. The competitive block list identifies advertisers or other entities prevented from targeting advertisements based on connections between users and objects of the entity. If a later received advertisement is targeted based on a connection between a user and an object of the entity, the social networking system determines whether the advertiser associated with the advertisement is included on the competitive block list. If the competitive block list includes the advertiser, the advertisement is determined not to be valid, and not presented to users. Otherwise, the advertisement is determined to be valid, and may be presented to users thereafter.

23 Claims, 3 Drawing Sheets

MANAGING TARGETING OF ADVERTISEMENTS BASED ON USER ASSOCIATIONS WITH SOCIAL NETWORKING OBJECTS

BACKGROUND

This invention relates generally to online advertising and in particular to managing advertisement targeting based on user associations with social networking objects.

In recent years, many commercial and private entities (e.g., companies, organizations, etc.) have established online presences over social networking systems for promotional purposes. For example, many commercial entities have created objects maintained by social networking systems (e.g., fan pages) that promote their brands, products, or services using the social networking systems. Social networking system users may interact with the objects, establish connections with, or otherwise associate with the objects. Advertisers can leverage the user connections with the objects to promote various brands, products, or services. For example, an advertiser may target advertisements based on the users having a connection to a company's brand page.

However, some advertisers now target advertisements to users based on the users having connections to objects in social networking systems associated with competing advertisers. For example, an advertiser of a particular brand of shoes may target advertisements at users connected to the brand page of a competing shoe company. Because of such targeting, some entities (e.g., the competing shoe company of the previous example) are becoming less inclined to expend resources developing user connections with objects in social networking systems. As a result, some social networking systems are beginning to experience decreases in the user connections maintained by the systems. Such decreases have adversely impacted the advertising revenue generated by the systems.

SUMMARY

In embodiments of the present invention, a social networking system allows entities to manage or control the targeting of advertisements to users based on associations between the users and objects associated with the entities. In particular, an entity provides the social networking system with a competitive block list associated with one or more objects created, owned, or administered by the entity. The competitive block list identifies other entities prevented from using user connections with objects of the entity to target advertisements. For example, a block list for a particular beverage manufacturer may identify competing soda companies that are to be prevented from using the user connections of the beverage manufacturer's objects for targeting advertisements. The competitive block list may further identify specific types of connections that are prevented from being used by entities on the block list for advertisement targeting. For example, the block list identifies that another entity may not use the "fan" type user connections for an entity's objects to target advertisements. In some embodiments, the block list includes a limited number of blocked entities, such as five, ten or twenty entities.

To enable management of advertisement targeting using block lists, the social networking system validates one or more advertisements received from various advertisers. In particular, the social networking system determines whether a received advertisement is associated with targeting criteria indicating targeting of users based on connections with objects associated with an entity. For example, the social networking system determines whether targeting criteria indicate targeting of an advertisement to users based on the users being fans of a page of an entity, where the entity is not the advertiser of the advertisement. If the received advertisement is to be targeted at users based on the users having connections to objects associated with an entity, the block list associated with the entity is retrieved. If the block list includes the advertiser associated with the advertisement, the social networking system does not validate the advertisement. If the advertisement is not validated, the advertisement is not presented to social networking system users. In one embodiment, the social networking system provides an indication to the advertiser that the advertisement was not validated. If the advertisement is not associated with targeting criteria indicating targeting based on connections with objects of an entity or if the block list associated with the entity does not include the advertiser of the advertisement, the social networking system validates the advertisement, subject to other conditions imposed by the social networking system (e.g., user privacy conditions, content restrictions, etc.). Subsequently the validated advertisement may be presented to users based on the users satisfying the targeting criteria of the advertisement.

By allowing an entity to manage targeting of advertisements, the social networking system allows the entity to prevent competitors from leveraging connections the entity's objects. This may make the entity more likely to encourage user interactions and accordingly connections with its objects over the social networking system. Furthermore, because a limited number of competing advertisers are prevented from leveraging connections to an entity's objects, many advertisers may still leverage information about the entity's objects in ways that are not harmful to the entity. For example, a car manufacturer may target advertisements towards users associated with a particular coffee purveyor, as such advertisements are unlikely to harm the coffee purveyor.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Social networking systems allow users to provide information about themselves in user profiles. For example, social networking systems enable users to provide biographic, demographic, and/or other types of descriptive information about themselves. Additionally, social networking systems allow users to establish connections with other users of the social networking system. When two users become connected, they are referred to as "friends," "contacts," "connections," or "associates" within the context of the social networking system. Generally, users connected to each other in a social networking system have access to more information about each other than available to users that are not connected to each other. Similarly, becoming connected within a social networking system may allow a user greater access to communicate with another user. For example, additional communication channels may be used by connected users to communicate with each other, such as email (internal and external to the social networking system), instant message, text message, phone, or any other communicative channel. Further, a user connected to another user may be allowed to view, comment on, download or endorse the other user's generated content items. Examples of content items include messages, queued messages (e.g., email), text and short message service (SMS) messages, comment messages, messages sent using any other suitable messaging technique, a hypertext transfer protocol (HTTP) link, hypertext markup language (HTML) files, images, videos, audio clips, documents, document edits, calendar entries or events, and other types of data.

Social networking systems also store objects representing various data maintained by the social networking system. Social networking system users may interact with any object (e.g., an object representing a group of users, an object representing an event, an object representing a content item, such as a web page, comment, user action, generic post, etc.) maintained by a social networking system. These interactions may have a variety of forms, such as providing content to an object, commenting on a content item presented by the object, indicating a preference or affinity for the object, viewing a content item associated with the object, joining an object, or any other suitable form of interaction. Users of social networking systems may also interact with other users by being connected to common objects or users within the social networking system.

Social networking system users may also interact with objects, users, or other information outside of the context of the social networking systems. For instance, an article on a news website may have a "like" button with which users of the social networking system interact to indicate a preference for the article. Similarly, a company's website may include an input for joining a group within the social networking system dedicated to the company.

In one embodiment, a user interaction involving an object maintained by the social networking system creates a connection between the user and the object in the social networking system. A connection may be an explicit relationship between a user and an object, such as a fan type connection between the user and the object. A connection may alternatively represent an implicit relationship between a user and an object formed based on a user interaction with the object (e.g., the user expressing a preference for the object). A social networking system may store connections as edges. For example, a user may express a preference for ("like") a brand page of a particular coffee company, so an edge between the user and the brand page describing the type of interaction between the user and the brand page is stored.

Social networking systems further allow advertisers to present advertisements to social networking system users. Such advertisements may be targeted to users having one or more characteristics satisfying targeting criteria associated with the advertisements. Targeting criteria for an advertisement may target users based on the users having connections with one or more objects maintained by the social networking system associated with an entity. For example, targeting criteria for an advertisement may be targeted at users who have previously liked a brand page of a particular mobile phone manufacturer.

In one embodiment, a social networking system allows an entity to manage or control the advertisers and/or other entities permitted to use connections with objects of the entity to target advertisements. For example, a coffee company may identify advertisers prevented from targeting advertisements to users based on the users having "liked" a brand page of the coffee company. While advertisers may continue to target advertisements using other characteristics of the users, this allows an entity to limit advertisers using connections to objects associated with the entity. In the preceding example, advertisers may continue to target users based on user profile information indicating an interest in coffee.

Figure 1:
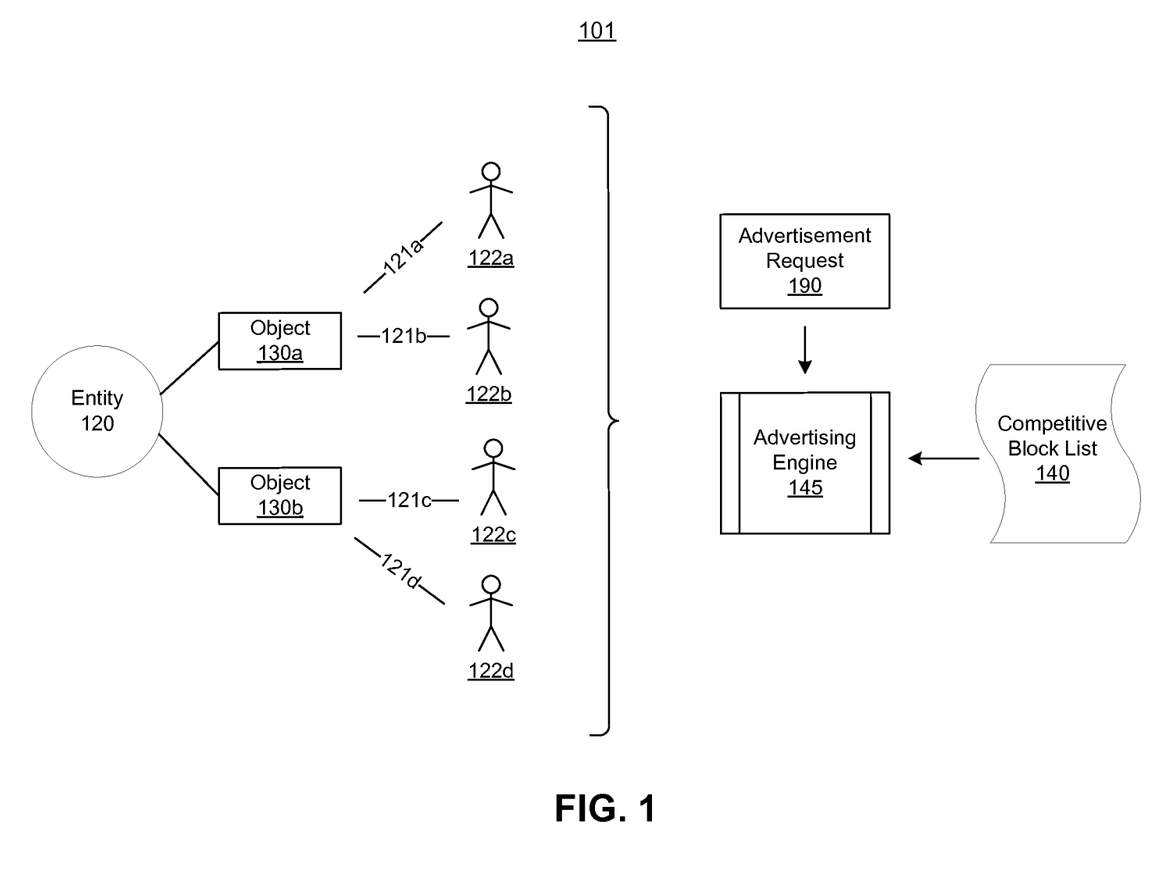
FIG. 1 is a block diagram of one embodiment of a process for managing advertisement targeting based on connections with an entity's objects in a social networking system, in accordance with an embodiment of the invention.

FIG. 1 shows a block diagram of one embodiment of a process for managing advertisement targeting based on connections of one or more objects associated with an entity in a social networking system 101. As shown in FIG. 1, an entity 120 is associated with objects 130a and 130b maintained by the social networking system 101. For example, the objects 130a, 130b are fan pages or brand pages promoting products or services of the entity 120. Users 122a, 122b, 122c, 122d of the social networking system 101 may be connected to one or more of the objects 130a, 130b through the social networking system 101. In one embodiment, the social networking system 101 stores edges 121a, 121b, 121c, 121d describing connections between the users 122 and one or more of the objects 130a, 130b. The edges 121 may be stored based on an interaction between a user 122 and an object 130. For example, in FIG. 1 the edge 121a may describe the user 122a becoming a "fan" of the object 130a, and/or "commenting" on the object 130a.

During operation, an advertising engine 145 of the social networking system 101 receives and stores a competitive block list 140 from the entity 120 associated with the objects 130. The competitive block list 140 identifies advertisers prevented from using connections to the objects 130 to target advertisements. Subsequently, the advertising engine 145 receives an advertisement request 190 identifying an advertisement and targeting criteria for identifying users eligible to be presented with the advertisement from an advertiser. The advertising engine 145 validates the advertisement of the advertisement request 190 by determining whether the targeting criteria of the advertisement request 190 target users based on the users having connections to one or more of the objects 130. If the advertisement request 190 includes targeting criteria specifying targeting based on user connections with an object 130, the advertising engine 145 retrieves the competitive block list 140 for the entity 120 and determines whether the block list 140 includes the advertiser providing the advertisement request 190. If the block list 140 includes the advertiser, the advertising engine 145 determines that the advertisement is not valid, and does not allow presentation of the advertisement to social networking system users. If the block list 140 does not include the advertiser, the social networking system 101 validates the advertisement, allowing the targeting criteria to use connections to the objects 130 when selecting users 122 to present the advertisement of the advertisement request 190.

System Architecture

Figure 2A:
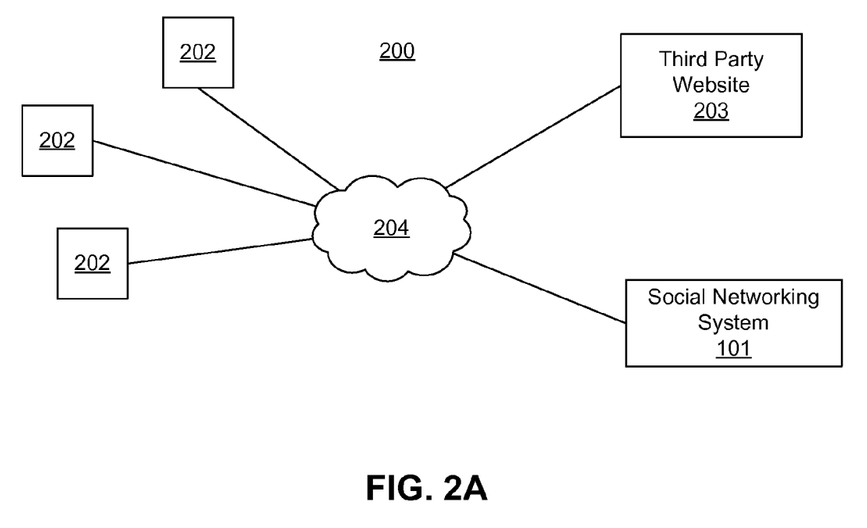
FIG. 2A is a block diagram of a system environment suitable for operation of a social networking system, in accordance with an embodiment of the invention.

FIG. 2A is a block diagram illustrating one embodiment of a system environment 200 including a social networking system 101. The system environment 200 shown in FIG. 2A includes one or more client devices 202, a network 204, a third party website 203, and the social networking system 101. While FIG. 2A shows three client devices 202 and a single third party website 203, any number of these entities (including millions) may be included. In alternative configurations, different and/or additional entities may be included in the system environment 200.

A client device 202 is a computing device capable of receiving user input as well as transmitting and/or receiving data via the network 204. Examples of the client devices 202 include desktop computers, laptop computers, tablet computers (pads), smart phones, personal digital assistants (PDAs), or any other devices including computing functionality and data communication capabilities. The client devices 202 are configured to communicate via the network 204. The client devices 202 allow various users to communicate with the social networking system 101.

The network 204 may be any wired or wireless local area network (LAN) and/or wide area network (WAN), such as an intranet, an extranet, or the Internet. The network 204 provides communication capabilities between one or more client devices 202, one or more third-party websites 203, and the social networking system 101. In various embodiments the network 204 may use standard communication technologies and/or protocols. Examples of technologies used by the network 204 include Ethernet, 802.11, 3G, 4G, 802.16, or any other suitable communication technology. Examples of protocols that may be used by the network 204 include transmission control protocol/Internet protocol (TCP/IP), hypertext transport protocol (HTTP), simple mail transfer protocol (SMTP), file transfer protocol (TCP), or any other suitable communication protocol. The third party website 203 is coupled to the network 204 to communicate with the social networking system 101, and provide various functionalities to users of the social networking system 101.

Figure 2B:
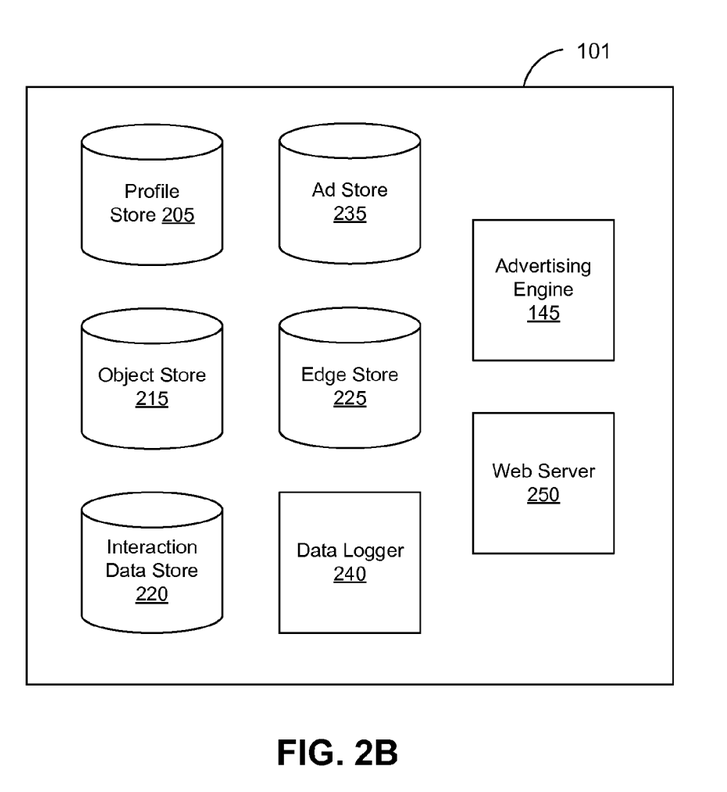
FIG. 2B is a block diagram of components of a social networking system, in accordance with an embodiment of the invention.

The social networking system 101, further described below in conjunction with FIG. 2B is a computing system that allows users to communicate or otherwise interact with each other and access content as described herein. In one embodiment, the social networking system 101 stores user profiles describing its users, including biographic, demographic, and other types of descriptive information. The social networking system 101 additionally stores various items of content with which its users can interact. In one embodiment, the social networking system 101 stores content as various objects. Examples of objects include fan pages, events, groups, advertisements, posts, content, brand objects, entity objects, etc.

FIG. 2B is a block diagram of one embodiment of the social networking system 101. In the embodiment shown by FIG. 2B, the social networking system 101 includes a profile store 205, an object store 215, an interaction data store 220, an edge store 225, an advertisement ("ad") store 235, a data logger 240, the advertising engine 145, and a web server 250. In alternative configurations, different components can be included in the social networking system 101.

Each user of the social networking system 101 is associated with a user profile, which is stored in the user profile store 205. A user profile includes declarative information about the user that was explicitly shared by the user and may also include profile information inferred by the social networking system 101. In one embodiment, a user profile includes multiple data fields, with each data field describing one or more attributes of the corresponding user of the social networking system 101. The information in a user profile describes a user corresponding to the user profile. Examples of information in a user profile include biographic information, demographic information, and other types of descriptive information, such as work experience, educational history, gender, hobbies or preferences, location and the like. A user profile in the user profile store 205 may also maintain references to actions by a user on objects in the social networking system and/or connections to other users.

While user profiles in the user profile store 205 are frequently associated with individuals, allowing users to interact with each other via the social networking system 101, user profiles may also be stored for entities such as businesses or organizations. This allows an entity to establish a presence on the social networking system 101 for connecting and exchanging content with other social networking system users. The entity may post information about itself, about its products or provide other information to users of the social networking system 101 using a brand page associated with the entity's user profile. Other users of the social networking 101 system may connect to the brand page to receive information posted to the brand page or to receive information from the brand page. A user profile associated with the brand page may include information about the entity itself, providing users with background or informational data about the entity. In some implementations, a profile may also be considered an object in the context of the social networking system 101.

The object store 215 stores objects describing content associated with the social networking system 101. Such objects may be accessible over the social networking system 101, and/or accessible external to the social networking system 101. Objects stored in the object store 215 may include various types of content, such as pages (e.g., fan pages or brand pages), events, groups, applications, general postings or comments, brand objects, entities, abstract ideas, etc. Additional types of content described by an object include text, images, videos, audio files, software applications, metadata, etc. For example, an object may be a fan page for a particular television set manufacturer that includes images and text about the manufacturer's products. An object may also be associated with a competitive block list identifying one or more advertisers prevented from using user connections to the object as targeting criteria for advertisements. The competitive block list may be stored in the object store 215 and associated with the object or may be stored in the user profile associated with the entity associated with the object.

Objects stored by the social networking object store 215 may have parent-child relationships with one another. For example, a particular object associated with a particular entity (e.g., a company) may be considered a parent object. Other objects, such as fan pages, events, groups, applications may be associated with the parent object and may be considered child objects of the parent object. In one embodiment, information associated with the parent object may also be associated with its child objects, and may also be associated with other objects that are children of the child objects. For example, a competitive block list associated with a parent object may also be associated with one or more child objects of the parent object, children objects of child objects, and so on. In this way, updating or modifying competitive block lists for multiple objects can be easily performed.

The object store 215 may store each object as a suitable structure including data describing the object. Example data describing the object includes: identifiers for the object, identifiers for a user account that owns or administers the object, content (e.g., text, images, links, etc.) associated with the object, information indicating whether the object is a child or parent (or neither), identification information for the parent or children of the object (if required), classification information for the object (e.g., a category to which the subject matter of the object relates, such as coffee, electronics, etc.), type information for the object (e.g., group type, event type, fan page type, etc.) and/or any other suitable information. Additionally, a competitive block list associated with the object may be stored in the structure maintained by the object store 215.

The interaction data store 220 tracks and stores user actions performed over the social networking system 101, as well as over external websites that communicate information to the social networking system 101. Users may interact with various objects on the social networking system 101, including commenting on posts, sharing links, and checking-in to physical locations via a mobile device, accessing content items in a sequence or other interactions. Additional examples of interactions with objects on the social networking system 101 stored in the interaction data store 220 include commenting on a photo album, communicating messages between users, becoming a fan of a musician, adding an event to a calendar, joining a group, becoming a fan of a fan page, creating an event, authorizing an application, using an application, and engaging in a transaction. Information describing these actions is stored in the interaction data store 220. Additionally, the interaction data store 220 stores user interactions with advertisements on the social networking system 101 as well as other applications operating on the social networking system 101. In some embodiments, data from the interaction data store 220 is used to infer interests or preferences of the user, augmenting the interests included in the user profile and allowing a more complete understanding of a user's preferences.

The interaction data store 220 may also store user actions taken on external websites, such as the third party website 203. For example, an e-commerce website that primarily sells sporting equipment at bargain prices may recognize users of the social networking system 101 through social plug-ins allowing the e-commerce website to identify users of the social networking system 101. Because users of the social networking system 101 are uniquely identifiable, third party websites 203, such as this sporting equipment retailer, may use information stored for the social networking system users when the social networking system users visit the third party websites 203. The interaction data store 220 stores data about these users, including webpage viewing histories, advertisements that were engaged, purchases made, and other patterns from shopping and buying.

The edge store 225 stores information describing connections between users and other users and/or objects associated with the social networking system 101. Data describing these connections are stored as edges in the edge store 225. Such data may include, for example, types for the connections. Some edges may define explicit connections or relationships, such as specifically established relationships between users and other users or between users and objects. For example, a user may establish a fan type connection or relationship with a brand page of a particular brand. Such a fan type connection may be recorded as an edge stored in the edge store 225. Other edges may define implicit connections between users and other users or objects. For example, a user may "like" a comment posted by an entity on a brand page of the entity, which is recorded as an edge stored in the edge store 225. Multiple connections between a user and a specific object may be recorded in a single edge stored in the edge store 225; alternatively, each connection is stored as a separate edge.

Additional data describing edges may be stored in the edge store 225, such as an affinity score. An affinity score of an edge may be computed by the social networking system 101 over time to approximate a user's affinity for a particular object or other social networking system user. Computation of the affinity score may be based on the interactions performed by the user and/or number of connections between the user and an object or other user. In one aspect, the more positive interactions and/or connections a user has with an object, the greater the affinity score associated with the edge between the object and the user. In one aspect, a particular type of connection may be established between a user and an object if the affinity score for an edge between the user and the object is equal to or exceeds a threshold affinity. Computation of affinity is further described in U.S. patent application Ser. No. 12/978,265, filed on Dec. 23, 2010, which is hereby incorporated by reference in its entirety.

The data logger 240 receives information about user interactions on and/or off the social networking system 101, and populates the interaction data store 220 with information describing the user interactions. Such interactions may include, for example, adding a connection to another user, sending a message to another user, uploading an image, reading a message from another user, viewing content associated with another user, attending an event, or other suitable actions between a user and an object or another user. Interactions between a social networking system user and objects within the social networking system 101 identified by the data logger 240 are stored in the interaction data store 220. Additionally, the data logger 240 may store and/or update edges in the edge store 225 based on user interactions.

The web server 250 links the social networking system 101 via the network 204 to one or more of the client devices 202, as well as to one or more third party websites 203. The web server 250 may include a mail server or other messaging functionality for receiving and routing messages between the social networking system 101 and the client devices 202 or third party websites 203. The messages may be instant messages, queued messages (e.g., email), text and SMS messages, or any other suitable messaging technique. In one embodiment, the web server 250 receives user requests for content, where an advertisement is to be provided with the content, and sends a request for an advertisement to the advertising engine 145. Similarly, the web server 250 may receive a request for an advertisement and send the request to the advertising engine 145 to identify an advertisement.

In one embodiment, the social networking system 101 stores advertisements in an advertisement ("ad") store 235. Advertisements are retrieved from the ad store 235 for presentation to social networking system users. In one embodiment, when an advertisement is received from an advertiser, an advertisement data structure is generated and stored in the ad store 235. The advertisement data structure includes a unique identifier associated with the advertisement, targeting criteria associated with the advertisement, content representing the advertisement, and any other suitable information. The targeting criteria associated with an advertisement may identify users eligible to be presented with the advertisement. More specifically, the targeting criteria may specify one or more characteristics of users to be presented with content of the advertisement. As described above, targeting criteria may target users based on connections between users and a particular entity.

The advertising engine 145 receives and presents advertisements to users. In one embodiment, the advertising engine 145 additionally receives competitive block lists from various entities, and validates received advertisements based on the competitive block lists. More specifically, upon receiving an advertisement via an advertisement request, the advertising engine 145 determines whether the advertisement is to be targeted at users based on the users having connections to a particular social networking object of an entity. If the advertisement targets users based on the users having connections with the particular social networking object of an entity, the social networking system retrieves the competitive block list for the entity. If the advertiser associated with the advertisement is on the block list, the advertising engine 145 does not successfully validate the advertisement. If the advertiser that provided the advertisement is not on the block list, the advertisement is stored in the ad store 235.

For an advertisement that is successfully validated, the advertising engine 145 may thereafter select the advertisement for presentation to a user based on targeting criteria for the advertisement. To determine whether a user satisfies targeting criteria, the advertising engine 145 may retrieve information associated with the user from the user profile store 205, the interaction data store 220, the edge store 225, or any other suitable data source. An advertisement selected by the advertising engine 145 may be presented in conjunction with content requested by the user or through any suitable communication channel.

Figure 3:
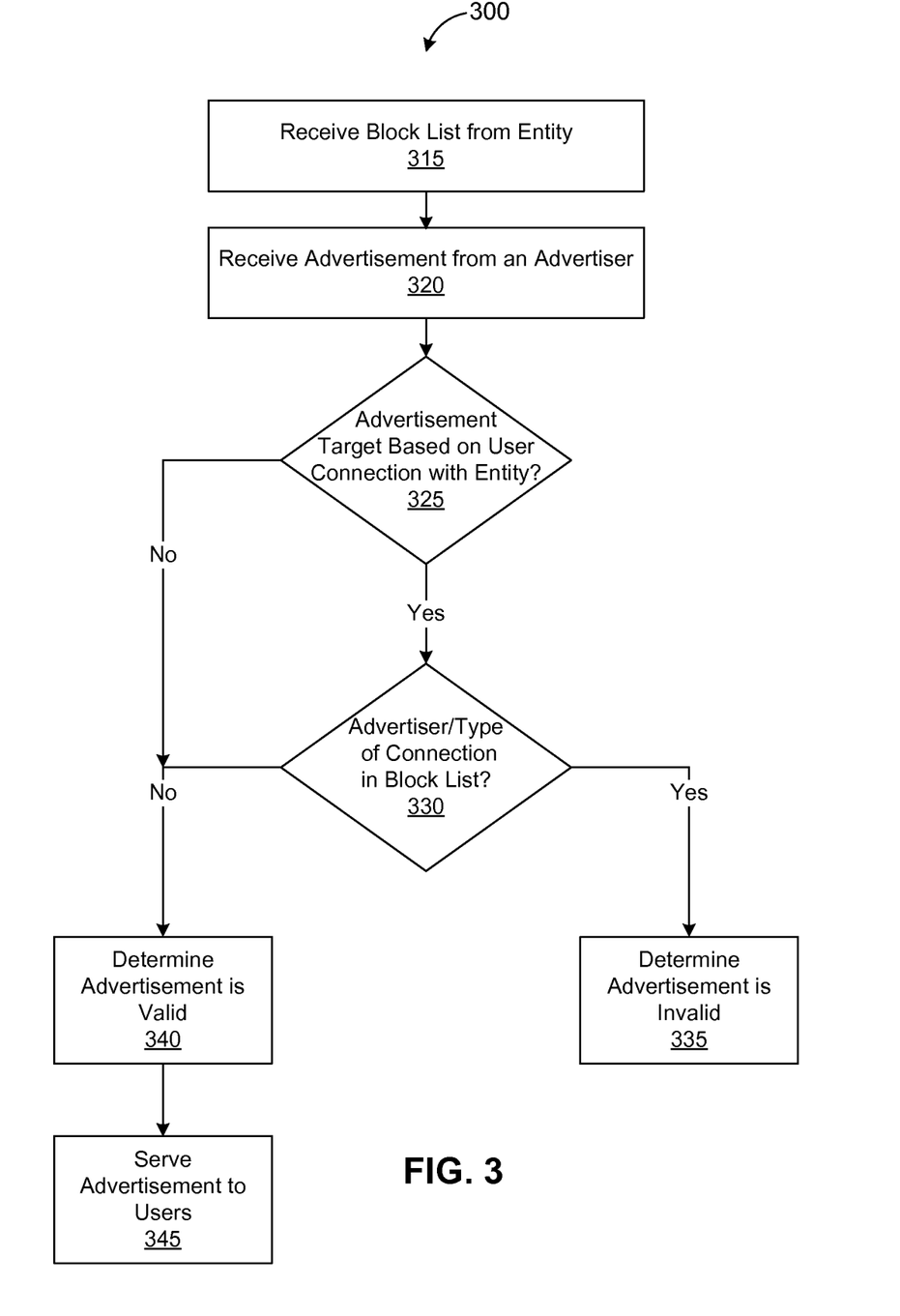
FIG. 3 is a flow chart of a process for managing advertisement targeting based on user connections to objects associated with an entity, in accordance with an embodiment of the invention.

Managing Advertisement Targeting Based on User Connections in a Social Networking System FIG. 3 shows a flow chart of one embodiment of a process 300 for managing advertisement targeting based on connections between users and objects maintained by a social networking system 101. The process 300 may be performed by any suitable component of the social networking system 101, such as the advertising engine 145.

In one embodiment, the advertising engine 145 receives 315 a competitive block list from an entity. Examples of entities include companies, businesses, organizations, individuals, etc. The received competitive block list may specify advertisers and/or other entities that are prevented from targeting advertisements based on user connections with one or more objects associated with the entity. Such objects may be accessible over the social networking system 101 and/or accessible external to the social networking system 101 (e.g., accessible via the third party websites 203). An object may be associated with an entity if the object is owned and/or administered by the entity. An object may be determined to be owned or administered by an entity if the object is associated with an identifier of the entity, associated with an account of the entity, has an owned by and/or administered by relationship with the entity, associated with (e.g., a child of) another object having an owned by and/or administered by relationship with the entity, created by an authorized user of the entity, maintained by an authorized user of the entity, etc.

In one embodiment, the competitive block list includes at least three types of information: object information, blocked advertiser information, and blocked connections information. The object information identifies those objects of the entity to which the competitive block list is to apply. The object information may identify the objects by including object names, object identifiers, object codes, etc. For example, the object information may specify a unique code previously assigned to a fan page of the entity. In one embodiment, while children objects may not be specifically identified in the object information, the competitive block list may still be applied to the children objects if the parent objects of the children objects are identified by the object information. For example, a particular group page may be the child of a particular brand page. Thus, if the competitive block list applies to the brand page, the competitive block list will also apply to the group page.

The blocked advertiser information identifies those advertisers or other entities that are prevented from targeting advertisements based user connections with the objects identified by the object information. The blocked advertiser information may identify the blocked advertisers or other entities by including advertiser names, advertiser codes, advertiser numbers, advertiser identifiers, or other information for identifying blocked advertisers. For example, a particular shoe company may be indicated by the blocked advertiser information through a unique social networking system identifier assigned to the shoe company.

The blocked connections information indicates the types of user connections that advertisers or other entities identified by the blocked advertiser information are prevented from using to target advertisements. Any type of connection maintained by the social networking system 101 may be indicated by the blocked connections information. Example types of connections include: fan type connections, like type connections, want type connections, comment type connections, share type connections, group join type, and/or attend type connections.

Hence, the competitive block list identifies advertisers or entities prevented from using certain connections to certain objects of the entity for targeting advertisements. For example, the competitive block list indicates that a particular advertiser is prevented from targeting advertisements to a user based on whether the user has a fan type connection to a page describing products manufactured by the entity. The competitive block list may additionally indicate that another advertiser is prevented from targeting advertisements to a user based on whether the user has a join type connection to a group related to products manufactured by the entity.

In one embodiment, the advertising engine 145 is used to generate a competitive block list for the entity. To generate the competitive block list, the advertising engine 145 allows an authorized user of the entity to identify one or more objects to which the competitive block list applies. For example, the advertising engine 145 provides, for selection, a listing of different objects or types of objects associated with the entity. The authorized user may thereafter select specific objects or types of objects from the listing to indicate the objects that are to apply to the competitive block list. In one embodiment, the advertising engine 145 may additionally or alternatively allow the authorized user to manually identify objects or types of objects to which the competitive block list applies.

The advertising engine 145 additionally allows the authorized user to identify one or more advertisers or other entities to which the competitive block list applies. For example, the advertising engine 145 provides, to the authorized user, a listing of advertisers or other entities determined to be competitors of the entity. The listing of competitors may be generated by identifying a category for the entity, and identifying advertisers or other entities that are also associated with the same category. Advertisers or other entities associated with the same category are included in the listing of competitors.

Categories for the entity, the advertisers, and/or the other entities may be explicitly provided by the entity, by the advertisers, or by the other entities. Alternatively, the categories may be determined based on content associated with the entity, advertisers, or other entities and/or determined based on any suitable social signals identified from the social networking system 101. As used herein, social signals may be any information derived from content associated with the entities, advertisers, or other entities stored by the social networking system 101 or derived from connections (e.g., fan type connections, like type connections) of the entities, advertisers, or other entities stored by the social networking system. For example, an entity may be associated with a particular category if content generated by users of the social networking system 101 and related to the entity include keywords associated with the category. As a specific example, an entity is associated with a beverage category if comments by users made with respect to the entity include keywords such as "drink" and "soda."

After receiving the listing of competitors, the authorized user of the entity selects one or more of the advertisers and/or other entities from the received listing. In another embodiment, the advertising engine 145 alternatively or additionally allows the authorized user to manually identify advertisers or other entities for inclusion in the competitive block list.

Additionally, the advertising engine 145 allows the authorized user to identify the types of connections that an advertiser and/or other entity on the competitive block list are prevented from using for targeting. For example, the advertising engine 145 provides a listing of different types of connections supported by the social networking system 101, allowing the authorized user to select types of connections from the listing. The advertising engine 145 may additionally or alternatively allow the authorized user to manually identify one or more types of connections.

In one embodiment, the number of advertisers or other entities identified by the competitive block list may be limited or restricted. For example, the advertising engine 145 may limit a competitive block list to including a maximum number of advertisers and/or other entities. In various embodiments, the maximum number of advertisers and/or other entities may be determined using any suitable method.

Following receipt of a competitive block list from an entity, the competitive block list may be stored in the object store 215 or the user profile store 205 in various embodiments. After the competitive block list is stored, the advertisement engine 145 subsequently receives 320 an advertisement for presentation to one or more users. As described above, the advertisement may be associated with targeting criteria. The targeting criteria identify one or more characteristics of users eligible to be presented with the advertisement.

After receiving the advertisement, the advertising engine 145 validates the advertisement by determining 325 whether targeting criteria of the advertisement target users based on user connections to an object associated with an entity. For example, the advertising engine 145 determines 325 whether the targeting criteria for the advertisement target users based on the users being fans of a brand page of a particular car manufacturer. The targeting criteria may explicitly indicate whether the advertisement is targeted at users based on a connection between a user and an object of the entity. For example, the targeting criteria may include specific identifiers or codes indicating targeting based on types of user connections to objects. In the example, the targeting criteria may additionally include identifiers (e.g., object identifiers, entity names, etc.) for an object and/or the entity used for targeting. Hence, the advertising engine 145 may determine 325 whether the targeting criteria indicate targeting based on a connection to an object of the entity.

In other embodiments, the targeting criteria do not explicitly indicate whether a connection between a user and an object of the entity is used to determine if the user is eligible to be presented with the advertisement. In such embodiments, the advertising engine 145 may analyze the targeting criteria to identify certain keywords, identifiers or other attributes indicative of targeting based on connections between users and objects of the entity. Based on identified keywords, identifiers, or other attributes, the advertising engine 145 determines 325 whether the advertisement is targeted based on a connection to an object of the entity.

For example, the advertising engine 145 identifies instances where the targeting criteria include identifiers for the entity and/or objects associated with the entity. As a specific example, the advertising engine 145 analyzes the targeting criteria to determine whether the targeting criteria include the name of a brand of coffee. The advertising engine 145 additionally determines whether the targeting criteria include keywords or other attributes indicative of user connections. For example, the advertising engine 145 determines whether the targeting criteria include keywords such as "fan," "like," "connection," etc. If the advertising engine 145 determines that the targeting criteria include both an identifier for the entity and/or an object of the entity, as well as keywords or other attributes indicative of targeting based on user connections, the advertising engine 145 determines 325 that the targeting criteria target users based on connections to an object of the entity.

Responsive to a determination 325 that the advertisement is not associated with targeting criteria identifying users based on connections to objects, the advertising engine 145 determines 340 that the advertisement is valid and may subsequently present or serve 345 the advertisements to users satisfying the targeting criteria.

However, responsive to a determination 325 that the advertisement is associated with targeting criteria identifying users based on connections to objects of the entity, the advertising engine 145 retrieves a competitive block list associated with the object identified by the targeting criteria or associated with the entity associated with the object. An identifier for the entity and/or an identifier for the object may be used to identify and retrieve the competitive block list from the object store 215 or from the user profile store 205.

After retrieving the competitive block list, the advertising engine 145 determines 330 whether the advertiser associated with the received advertisement is included in the retrieved competitive block list. The advertising engine 145 also determines whether the competitive block list indicates the type of connection to the object identified by the targeting criteria.

If the advertiser or type of connection is not indicated by the competitive block list, the advertising engine 145 may determine 340 that the advertisement is valid and subsequently present or serve 345 the advertisement to users satisfying the targeting criteria.

If it is determined 330 that the advertiser is in the competitive block list and the type of connection to the object identified by the targeting criteria is indicated by the competitive block list, the advertising engine 145 determines 335 that the advertisement is invalid and prevents the advertisement from being presented to users of the social networking system 101. In one embodiment, the advertising engine 145 may indicate to the advertiser that the advertisement is not valid because it targets users based on a connection to an object associated with a competitive block list identifying the advertiser. In other embodiments, the advertising engine 145 indicates that the advertisement is not valid, but does not provide a reason for the invalidity. In one embodiment, the advertising engine 145 does not consider the type of connection indicated in the targeting criteria. Rather, the advertising engine 145 determines whether an advertisement is invalid based on whether an advertiser is on the competitive block list.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    storing, by a social networking computer system, an object associated with an entity;
    storing, by the social networking computer system, a set of connections between the object and one or more users of the social networking computer system;
    receiving, from the entity, a competitive block list associated with the object, the competitive block list including one or more advertisers whom the entity identified as ones to be prevented from targeting advertisements to users based on the users having connections to the object associated with the entity;
    receiving an advertisement associated with an advertiser other than the entity;
    determining, by the social networking computer system, whether the advertisement is associated with targeting criteria specifying users connected to the object;
    responsive to determining the advertisement is associated with targeting criteria specifying users connected to the object, retrieving the competitive block list associated with the object;
    preventing, by the social networking computer system, use of the targeting criteria specifying users connected to the object if the advertiser is included on the competitive block list associated with the object; and
    determining, by the social networking computer system, that the targeting criteria specifying users connected to the object are valid if the advertiser is not included on the competitive block list associated with the object.

2. The computer-implemented method of claim 1, wherein the competitive block list further identifies one or more types of connections to the object prevented from being used to target advertisements.

3. The computer-implemented method of claim 2, wherein a type of connection is a connection created responsive to a user requesting to be a fan of the object associated with the entity.

4. The computer-implemented method of claim 2, wherein a connection is established based on an interaction between a user and the object.

5. The computer-implemented method of claim 4, wherein the interaction is selected from a group consisting of: the user requesting to be a fan of the object, the user selecting an item indicating that the user likes the object, the user selecting an item indicating that the user wants the object, the user requesting to share the object with additional users, and any combination thereof.

6. The computer-implemented method of claim 1, wherein at least one connection in the set of connections is associated with an affinity score between a user and the object.

7. The computer-implemented method of claim 1, wherein the object is a page associated with the entity.

8. The computer-implemented method of claim 1, wherein determining whether the advertisement is associated with targeting criteria specifying users connected to the object comprises:
    identifying one or more identifiers associated with the object in the targeting criteria associated with the received advertisement.

9. A computer-implemented method comprising:
    storing, by a social networking computer system, one or more objects associated with an entity;
    receiving a competitive block list from the entity, the competitive block list identifying additional entities associated with the social networking computer system, the additional entities being are restricted from targeting advertisements to users based on one or more connections to the one or more objects associated with the entity;
    receiving an advertisement associated with an advertising entity;
    determining, by the social networking computer system, whether targeting criteria associated with the advertisement specify a connection to an object from the one or more objects associated with the entity;
    determining, by the social networking computer system, whether the advertising entity is identified by the competitive block list; and
    responsive to the targeting criteria associated with the advertisement specifying the connection to the object associated with the entity and determining the advertising entity is identified by the competitive block list, preventing, by the social networking computer system, use of the targeting criteria specifying the connection to the object.

10. The computer-implemented method of claim 9, wherein the competitive block list further identifies one or more types of connections to the one or more objects restricted from being used to target advertisements to users.

11. The computer-implemented method of claim 10, wherein a type of connection identified by the competitive block list is based on an interaction with the one or more objects associated with the entity, the interaction selected from a group consisting of: the user requesting to be a fan of the object, the user selecting an item indicating that the user likes the object, the user selecting an item indicating that the user wants the object, the user requesting to share the object with additional users, and any combination thereof.

12. The computer-implemented method of claim 10, wherein a type of connection identified by the competitive block list is based on an affinity score between a user and an object from the one or more objects equaling or exceeding a threshold score.

13. The computer-implemented method of claim 9, wherein an object from the one or more objects is a page associated with the entity.

14. The computer-implemented method of claim 9, wherein determining whether targeting criteria associated with the advertisement specify a connection to an object associated with the entity comprises:
identifying one or more identifiers associated with the object in the targeting criteria associated with the received advertisement.

15. A computer-implemented method comprising:
storing, by a social networking computer system, an object associated with an entity;
receiving a request from the entity identifying one or more additional entities to restrict from targeting advertisements to a user based on a connection between the user and object associated with the entity;
receiving an advertisement associated with an additional entity and targeting criteria;
if the advertisement is associated with targeting criteria selecting a user based on a connection between the user and the object associated with the entity, determining, by the social networking computer system, whether the additional entity is identified by the received request;
determining, by the social networking computer system, that the targeting criteria are valid if the additional entity is not identified by the received request; and
preventing, by the social networking computer system, use of the targeting criteria if the additional entity is identified by the received request.

16. The computer-implemented method of claim 15, wherein a particular user is connected to the object associated with the entity if the particular user performs an interaction with the object.

17. The computer-implemented method of claim 16, wherein the interaction with the object comprises the particular user requesting to indicate a preference for the object.

18. The computer-implemented method of claim 16, wherein the one or more additional entities are associated with a same product category as the entity.

19. The computer-implemented method of claim 16, wherein a product category for the entity is determined from content associated with the entity.

20. The computer-implemented method of claim 1, wherein the object is one of a plurality of objects stored by the social networking system, each of the plurality of objects associated with a different entity and each of the plurality of objects connected to a plurality of different users of the social networking computer system.

21. A computer program product comprising a non-transitory computer-readable storage medium containing computer program code for:
storing an object associated with an entity;
storing a set of connections between the object and one or more users of a social networking system;
receiving, from the entity, a competitive block list associated with the object, the competitive block list including one or more advertisers whom the entity identified as ones to be prevented from targeting advertisements to users based on the users having connections to the object associated with the entity;
receiving an advertisement associated with an advertiser other than the entity;
determining whether the advertisement is associated with targeting criteria specifying users connected to the object;
responsive to determining the advertisement is associated with targeting criteria specifying users connected to the object, retrieving the competitive block list associated with the object;
preventing use of the targeting criteria specifying users connected to the object if the advertiser is included on the competitive block list associated with the object; and
determining that the targeting criteria specifying users connected to the object are valid if the advertiser is not included on the competitive block list associated with the object.

22. A computer program product comprising a non-transitory computer-readable storage medium containing computer program code for:
storing one or more objects associated with an entity;
receiving a competitive block list from the entity, the competitive block list identifying additional entities associated with a social networking system, the additional entities being restricted from targeting advertisements to users based on one or more connections to the one or more objects associated with the entity;
receiving an advertisement associated with an advertising entity;
determining whether targeting criteria associated with the advertisement specify a connection to an object from the one or more objects associated with the entity;
determining whether the advertising entity is identified by the competitive block list; and
responsive to the targeting criteria associated with the advertisement specifying the connection to the object associated with the entity and determining the advertising entity is identified by the competitive block list, preventing use of the targeting criteria specifying the connection to the object.

23. A computer program product comprising a non-transitory computer-readable storage medium containing computer program code for:
storing an object associated with an entity;
receiving a request from the entity identifying one or more additional entities to restrict from targeting advertisements to a user based on a connection between the user and object associated with the entity;
receiving an advertisement associated with an additional entity and targeting criteria;
if the advertisement is associated with targeting criteria selecting a user based on a connection between the user and the object associated with the entity, determining whether the additional entity is identified by the received request;
determining that the targeting criteria are valid if the additional entity is not identified by the received request; and
preventing use of the targeting criteria if the additional entity is identified by the received request.

* * * * *